July 14, 1931.  C. M. RODGERS  1,814,571

FISH BAIT

Filed May 13, 1929

INVENTOR.
Claude M. Rodgers.
BY
ATTORNEY.

Patented July 14, 1931

1,814,571

UNITED STATES PATENT OFFICE

CLAUDE M. RODGERS, OF CLAY TOWNSHIP, ST. JOSEPH COUNTY, INDIANA, ASSIGNOR TO SOUTH BEND BAIT COMPANY, OF SOUTH BEND, INDIANA

FISH BAIT

Application filed May 13, 1929. Serial No. 362,773.

The invention relates to fish baits, and particularly to the "weedless" type of bait, and has for its object to provide a device of this character on which is mounted a weed guard, the hooks of the device being adapted to have only a limited movement relative to the bait body whereby the point of the hook will not project beyond the weed guard.

A further object is to provide a device of this character in which the hooks are journaled in bearing members, said bearing members being constructed to permit the hooks to have a limited unidirectional pivotal movement therein.

A further object is to provide a device of this character in which single hooks are journaled in bearing members mounted in the bait body, said bearing members and hooks being constructed and relatively arranged to permit a limited pivotal movement of the hooks relative to the bait body, said movement being limited to prevent the points of the hooks from projecting beyond a weed guard extending from the bait body in a direction and manner to prevent the interference of weeds with the hooks, but without interfering with the impaling of fish upon the hooks.

A further object is to provide a device of this character having bearing members in which hooks are journaled for pivotal movement, with said hook shanks extending rearwardly at right angles from said bearing members, said bearing members carrying means disposed on opposite sides of the hook shank in the path of travel thereof adapted to limit the pivotal movement of the hooks in said bearing members.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
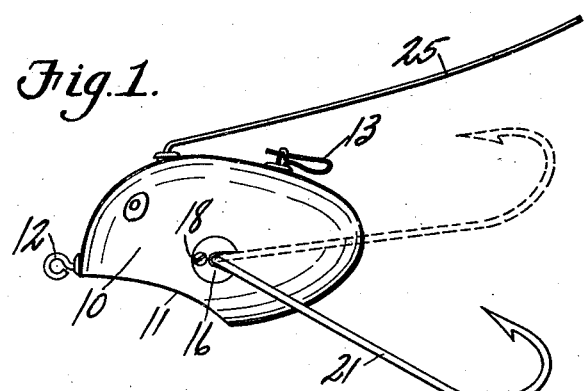
Figure 1 is a view of the bait in side elevation.
Figure 3:
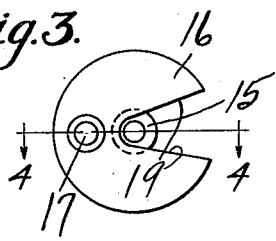
Figure 3 is a view of the bearing in front elevation.
Figure 2:
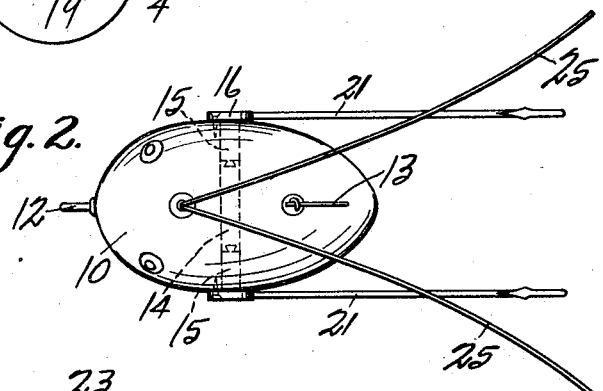
Figure 2 is a top plan view of the bait.
Figure 4:
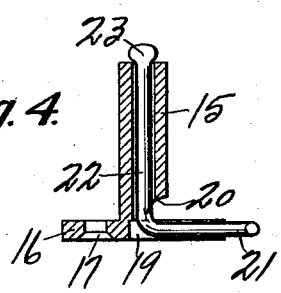
Figure 4 is a transverse sectional view of the bearing taken on line 4—4 of Figure 3.

Referring to the drawings, the numeral 10 designates a bait body of the plug or surface bait type, said body being preferably ovate in shape with the forward lower end thereof partially cut away to form a rearwardly downwardly curving face 11 adapted to agitate the water in passing therethrough. A line receiving eyelet 12 is secured to the forward end of the body substantially axially thereof, and a spring hook 13 adapted to carry pork rind or other bait is centrally secured to the upper side of the bait body adjacent the rear end thereof. Weed guards 25 are secured to the upper side of the body substantially centrally thereof and extend divergently rearwardly and slightly upwardly therefrom.

A transverse bore 14 is formed in the body 10 intermediate the ends thereof, and tubular bearing members 15 are adapted to extend into said bore from both ends thereof. Each tubular bearing member 15 has a flange 16, preferably circular in shape, formed at the outer end thereof, said flange having a countersunk screw receiving hole 17 formed therein by means of which a screw 18 secures the tubular member and flange to the bait body in proper position. A V-shaped recess 19 extending from a point adjacent the bore of the tubular bearing member to the periphery thereof is formed in the flange, and the end of the tubular member adjacent said recess is cut away at 20, for purposes to be hereinafter set forth. Fish hooks 21 are carried by the bait body, having their ends 22 journaled in the bearings 15 with the projecting tips thereof flattened at 23 to prevent removal thereof from the bearing, said ends 22 being bent at right angles to the shanks of the hooks.

Each flange 16 is secured to the bait body with its recess 19 rearwardly directed, and the right angle bend in the fish hook 21 is formed at a point permitting the shank of the hook to extend rearwardly of the bait from the bearing and through the recess 19, the cut-away 20 in the end of the tubular member accommodating said bend. Thus the sides of the recess 19 are adapted to limit the pivotal movement which each hook 21 is permitted to have, and the inclination of the upper side of the recess with relation to the longitudinal axis of the bait body may be so fixed in securing the flange to the body that the point of the hook will not project upwardly beyond the weed guards 25. In this manner the hooks have the advantage of movement relative to the bait body, but are prevented from catching in weeds and the like. It will be seen that this construction permits the hooks to be carried by the opposite sides of the bait body, and consequently, as the pork rind or other bait extends substantially centrally rearwardly of the bait from the hook 13, a fish in striking the bait body from the rear, especially when in pursuit of said pork rind, will be impaled upon one or both of the hooks 21 without regard to the direction from which it strikes. Furthermore, the weed guards are so formed and positioned that they will not materially interfere with the impaling of fish on the hooks.

The invention having been set forth, what is claimed as new and useful is:

1. In a fish bait, a bait body, a tubular bearing carried by said body, and a hook journaled in said bearing, said bearing being formed to limit the rotation of said hook therein.

2. In a fish bait, a bait body, a weed guard, a bearing carried by said body, and a hook journaled in said bearing, said bearing being formed to limit the movement of the hook in the bearing whereby the point thereof will not project beyond the weed guard.

3. In a fish bait, a bait body, a bearing mounted in the side of said body, a flange formed at the outer end of said bearing and having a recess formed therein, and a hook having one end thereof journaled in said bearing and extending rearwardly therefrom through said recess.

4. In a fish bait, a bait body, a bearing carried by said body, a hook, said hook having its shank angularly bent and journaled in said bearing, and means carried by said bearing adapted to limit the rotation of the hook shank therein.

5. In a fish bait, a bait body, a bearing carried by said body, a hook having its end journaled in said bearing and bent at right angles to the shank thereof, and means carried by the bearing on opposite sides of said shank to limit the rotation of the hook.

6. In a fish bait, a bait body, a tubular bearing mounted in said body, a flange formed at the outer end of said bearing and having a recess extending from the center of the edge thereof, and a hook having its end journaled in said bearing and bent at right angles to its shank, the sides of said recess limiting the rotation of said hook in said bearing.

7. In a fish bait, a bait body, a tubular bearing mounted in the side of said body, a flange formed at the outer end of said bearing and having a recess formed therein diverging outwardly from the center thereof, and a hook having its end journaled in said bearing, the shank of said hook extending at right angles from said bearing through said recess, the sides of said recess limiting the rotation of said hook in said bearing.

8. In a fish bait, a bait body, a tubular bearing member mounted in the side of said body and having a circular flange formed at the outer end thereof, said flange having a V-shaped recess extending rearwardly from the center thereof, and a hook having its end journaled in said bearing and extending rearwardly therefrom through said recess, whereby the inclination of the sides of said recess limits the pivotal movement of said hook in said bearing.

9. In a fish bait, a bait body, a weed guard carried by and extending rearwardly from the upper side of said body, a tubular bearing mounted in the side of said body and having a flange formed at the outer end thereof and projecting from said body, said flange having a V-shaped recess extending rearwardly from a point adjacent the bore of said bearing, and a hook having its end journaled in said bearing and extending rearwardly therefrom through said recess, said recess being formed to limit the pivotal movement of the hook to prevent the point of the hook from projecting beyond said weed guard.

10. In a fish bait, a bait body, a tubular bearing mounted in the side of said body having a flange formed at the outer end thereof and projecting from said body, said flange having a recess formed therein extending divergently rearwardly from a point adjacent the bore of said bearing, and a hook journaled in said bearing and extending rearwardly therefrom through said recess whereby the sides of said recess limit the pivotal movement of the hook in said bearing.

In testimony whereof I affix my signature.

CLAUDE M. RODGERS.